No. 890,433. PATENTED JUNE 9, 1908.
W. C. MATTHIAS.
SEWAGE DISPOSAL APPARATUS.
APPLICATION FILED MAR. 19, 1908.
3 SHEETS—SHEET 1.
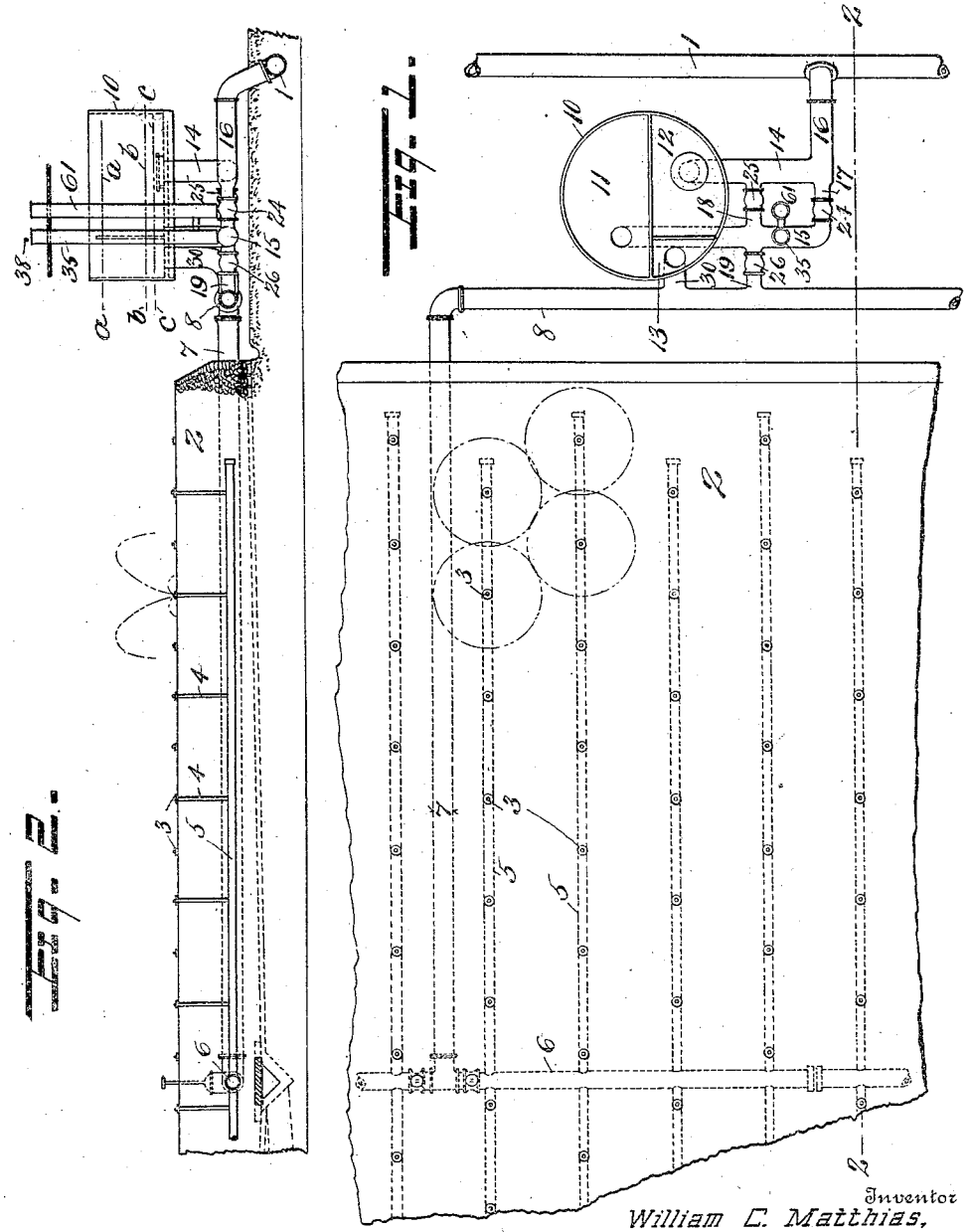
Inventor
William C. Matthias,
Witnesses No. 890,433. PATENTED JUNE 9, 1908.
W. C. MATTHIAS.
SEWAGE DISPOSAL APPARATUS.
APPLICATION FILED MAR. 19, 1908.
3 SHEETS—SHEET 2.
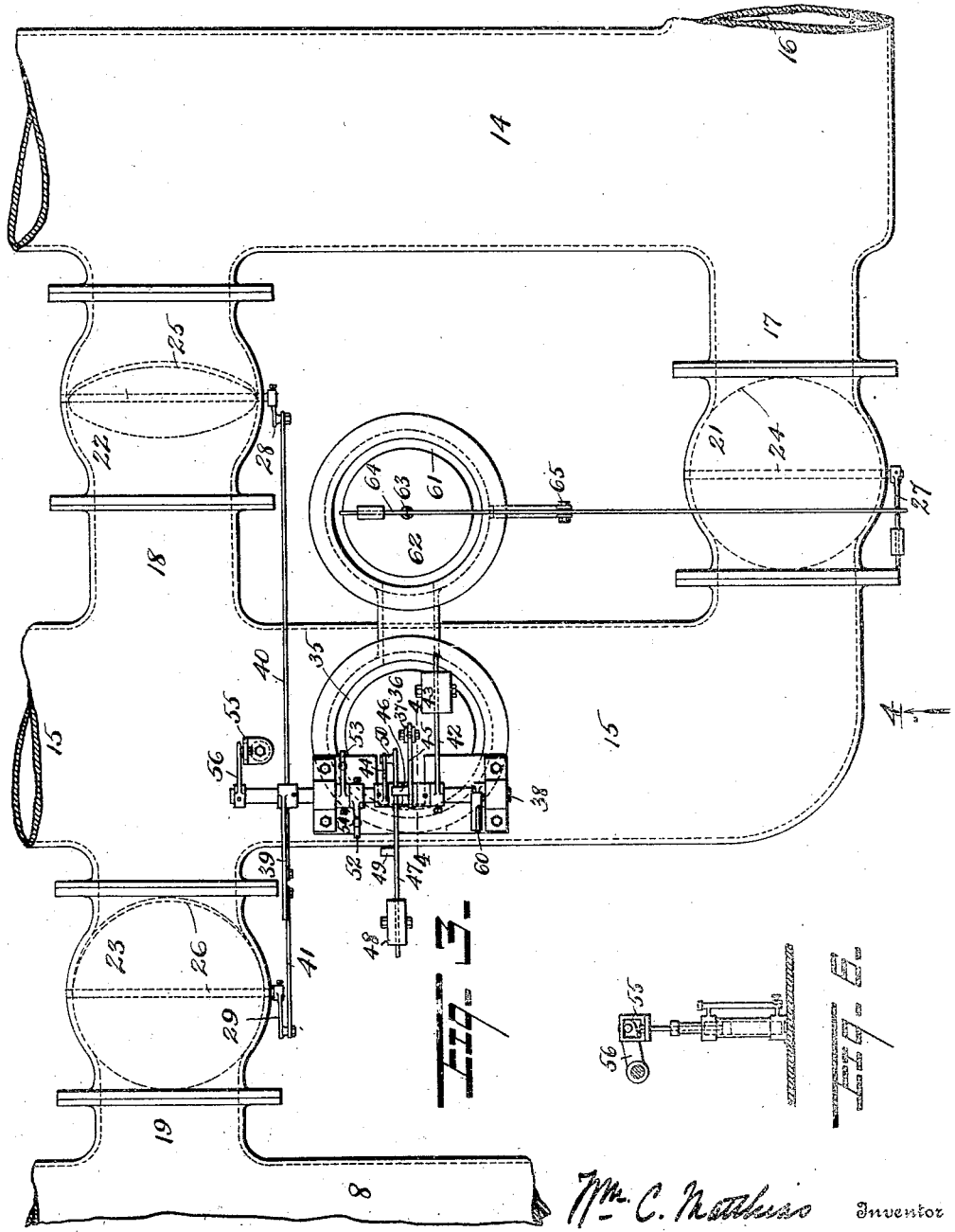

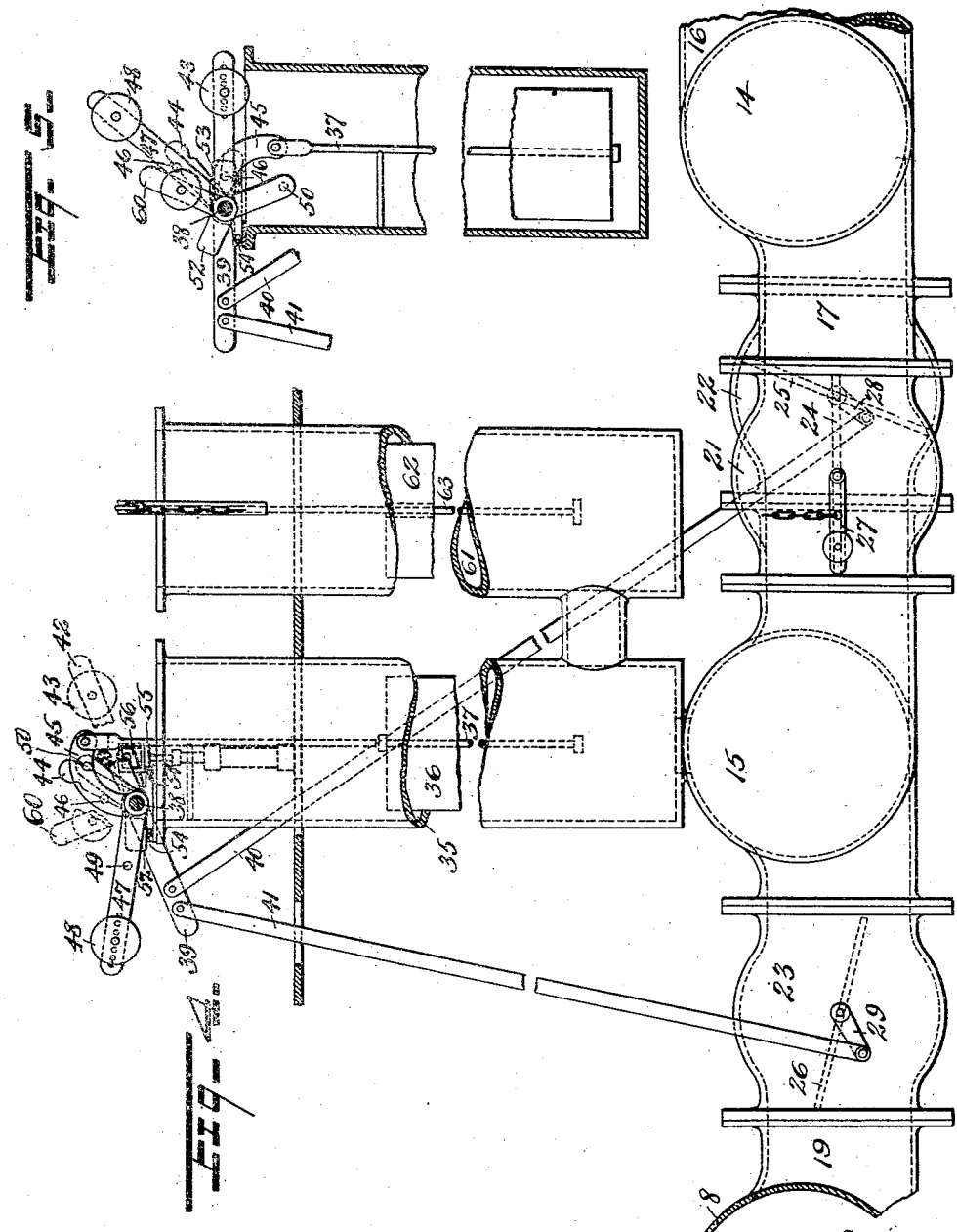

UNITED STATES PATENT OFFICE.

WILLIAM C. MATTHIAS, OF READING, PENNSYLVANIA, ASSIGNOR TO OLIVER M. WEAND, OF READING, PENNSYLVANIA.

SEWAGE-DISPOSAL APPARATUS.

No. 890,433.   Specification of Letters Patent.   Patented June 9, 1908.

Application filed March 19, 1908. Serial No. 422,153.

*To all whom it may concern:*

Be it known that I, WILLIAM C. MATTHIAS, a citizen of the United States, and a resident of the city of Reading, in the county of Berks and State of Pennsylvania, have invented certain new and useful Improvements in Sewage-Disposal Apparatus, of which the following is a specification.

My invention relates to sewage purification and particularly to sprinkling filter apparatus therefor.

The partially purified sewage has heretofore been discharged upon filter beds by means of sprinkling nozzles to which it is distributed through suitable conduits connected with a so-called "dosing apparatus" interposed between the distributing conduits and the main supply conduit.

My invention consists in improved dosing apparatus adapted to automatically provide an intermittent varying-head flow of sewage to the sprinklers, as hereafter fully described in connection with the accompanying drawings illustrating a preferred embodiment of the invention; and the novel features are specifically pointed out in the claims.

Figure 1 is a diagrammatic view showing the general arrangement of the dosing apparatus and its relation to the filter beds and sprinklers; and Fig. 2 is a corresponding elevation, in cross-section on the line 2—2 of Fig. 1. Fig. 3 is a much enlarged partial plan view showing the valve operating mechanism. Fig. 4 is an elevation of the same looking in the direction of the arrow 4, Fig. 3, showing the valve-operating floats in raised position and the valve operating mechanism in corresponding position; the view of said mechanism being a cross-section on the line 4—4 of Fig. 3, but the position of the weighted arms which are cut away, being indicated in dotted lines. Fig. 5 is a partial elevation similar to Fig. 4, but showing the valve operating mechanism in the different positions which automatically result from the fall of the main float. Fig. 6 shows separately the cushion stop device preferably employed to control the rotary movement of the valve-operating shaft.

1 represents the main supply conduit to filter beds 2, said conduit leading for instance from the septic tank of a sewage purification plant. The series of sprinkling nozzles 3, 3, 3, above said bed, and by means of which the effluent is suitably discharged upon the latter, are carried as indicated by riser pipes 4, 4, connecting with a system of distributer pipes 5, 6, 7, leading to a main distributer conduit 8. The dosing apparatus which controls the flow of the effluent to these sprinklers and which constitutes my invention, is interposed between the supply conduit 1 and the main distributer conduit 8. This dosing apparatus comprises a suitably elevated tank or reservoir 10, which as shown is divided into three compartments, namely a main dosing compartment 11, a storage compartment 12, and an overflow compartment 13, arranged to receive the overflow from compartment 12. Leading to the compartments 12 and 11 respectively are parallel conduits 14 and 15, the former (14) connecting to a branch 16 of the main supply conduit 1, and the latter (15) communicating through transverse connections 17 and 18 with the storage conduit 14, and through another connection 19 with the main distributer conduit 8. The connections 17, 18 and 19 are provided with separate valved-chambers 21, 22 and 23, each having a butterfly valve, marked respectively 24, 25 and 26, provided with a suitable exterior crank 27, 28 or 29, for operating the same. An additional connection 30 affords communication between the overflow compartment 13 and the main distributer conduit 8.

The flow from the main supply conduit 1, through the reservoir 10 to the main distributer 8 and the connected sprinklers, is controlled by an automatic valve-operating mechanism which is adapted to produce an intermittent varying-head discharge from the sprinklers so as to uniformly distribute the sewage liquid from each sprinkler over the adjacent filter-bed area. This mechanism comprises a float chamber 35, formed as shown by a riser pipe from the conduit 15 in which the head of liquid will correspond with that in the dosing compartment 11 of the reservoir 10. This chamber has a float 36 therein mounted upon a collared float rod 37; and said rod is adapted as hereafter described to impart a rocking movement to a suitably mounted rotary shaft 38 having a valve-operating arm 39 with connections 40 and 41 to the cranks 28 and 29 of the valves 25 and 26, as indicated. The shaft 38 is provided with a fixed arm 42 having an adjustable counterbalance weight 43, and with a fixed crank-arm 44, which latter is acted upon by the rise and fall of the float 36, as follows: The upper end of the float rod 37 is connected to a loosely mounted arm 45 on the shaft 38, so that said arm is freely raised and lowered with the float. This arm is provided with a laterally projecting pin 46, which is adapted to contact with an adjacent loosely mounted bell-crank lever 47 on the shaft 38 so as to positively swing said lever a limited distance in one direction or the other as determined by the float movement. The lever 47 is provided with a weight 48 and a lateral projection 49 on the long arm thereof, and with a similar lateral projection 50 on its shorter arm, which projections are adapted to contact with the opposite edges of the fixed crank-arm 44, at certain portions of the swing of the lever, so as to turn the shaft 38 in one direction or the other and thereby reversely operate the two connected valves 25 and 26; this turning action of the lever upon the shaft being effected in both directions by the fall of the weighted end of the lever 47, which swinging end is merely moved to one side or other of the dead center by the rise or fall of the float 36 causing intermittent contact of the loosely mounted shaft arm 45 with the lever. The turning movement of the shaft 38 under the impact of the falling weight 48 of the lever 47, is positively limited in each direction as shown, by providing stop-arms 52 and 53 on said shaft, adapted to seat against adjustably fixed stops 54; and to avoid the objectionable jar otherwise liable to occur I employ also a hydraulic cushion of well-known construction as indicated in Fig. 6, the slotted plunger head 55 of which is connected to a fixed arm 56 on the shaft so that the stop-arms 52, 53 will be easily and quietly seated by the cushioned movement of the plunger.

To prevent unintended turning movement of the shaft 38 due to possible binding or undue friction of the loose float-connected arm 45, I employ a supplemental weighted arm 60 (see Fig. 5) fixed to the shaft 38 so as to resist such a premature turning movement though adapted to coöperate with the weighted lever 47 when the latter is operating by its fall to normally turn the shaft (see Fig. 4).

Before further referring to the joint operation of the valves 25 and 26 I will briefly describe the separate means provided as shown for correspondingly operating the additional valve 24. For this purpose I employ a second riser pipe forming a separate float chamber 61, which is connected with the float chamber 35 and is provided with a float 62 on a collared rod 63, which latter is connected to one end of a valve operating lever 64, pivoted at 65 and suitably connected at its opposite end to the crank 27 of valve 24; said lever 64 being suitably balanced so as to be readily operated by the float to turn the valve 24 as determined by the head of liquid in the float chambers.

The main supply conduit is always in communication with the storage compartment 12 of reservoir 10, but its communication with the dosing compartment 11 and with the main distributer conduit 8, and the communication of the storage and dosing compartments with said conduit 8, are automatically regulated by the float-operated valve mechanism so as to intermittently cut-off the flow to the conduit 8, and also to vary the head of such flow so as to gradually reduce the spread of the sprinkler discharge thereby fully utilizing the filter bed area. Starting at a time when there is no discharge from the sprinkler nozzles, the float 62 will be in lowered position closing the valve 24, and the float 36 will also be lowered with its connected valve operating mechanism in the positions indicated in Fig. 5, valve 25 being open and valve 26 closed. The sewage now flows into both the dosing and storage compartments (11 and 12), the level being the same in both since they are connected through valve 25. As the liquid rises valve 24 is opened by the float 62, and as the compartments 11 and 12 are filled the float 36 is fully raised, lifting the connected arm 45 from the position indicated in Fig. 5 until its pin 46 engages the loosely mounted lever 47 and swings the weighted end 48 thereof past the dead center so that it will fall to the position indicated in Fig. 4; which falling movement, by engagement of the lever pin 50 with the fixed crank arm 44, turns the shaft 38 and its valve operating arm 39 as shown in Fig. 4, thereby simultaneously opening the valve 26 and closing the valve 25. The liquid now flows freely from the latter including any overflow from compartment 13, being also supplemented as indicated by the direct flow from the main 1, valves 24 and 26 being open and valve 25 closed. As the liquid is drained from the reservoir compartments the head on the sprinkler nozzles gradually falls, from a maximum of say seven feet (indicated at $a$ Fig. 2), to three and a half feet ($b$), when the valve 24 is closed by the corresponding fall of the float 62 cutting off communication between the main supply conduit 1 and the sprinklers and turning the direct flow into the storage compartment 12 to refill the latter. The gradually reducing discharge from the dosing compartment 11 to the nozzles however continues until the head on the nozzles reaches the determined minimum ($c$ Fig. 2), when the valve operating mechanism will be returned to the position indicated in Fig. 5 by the reverse operation of the falling float 36, through the weighted lever 47, upon the rocker shaft 38, thereby returning to the starting conditions by closing valve 26 and opening valve 25.

The cycle of operations described will be automatically repeated indefinitely, the time taken for each cycle and the intervals of rest being of course changeable to some degree by variations in the flow, but the desired uniform and satisfactory automatic distribution of the sewage being practically secured at all times.

The preferred mechanism specifically described and shown may of course be considerably modified within the spirit of my invention as set forth in the claims.

What I claim is:—

1. In a sewage filtration system having a series of stationary sprinkling nozzles, distributer conduits thereto and a main supply conduit, a dosing apparatus comprising a reservoir having a storage compartment and conduit, and a dosing compartment and conduit, said closing conduit being in communication with said storage conduit through two separate valves and with a distributer conduit through a third valve, and float operated mechanism for automatically operating said valves to produce an intermittent varying-head flow to the sprinklers substantially as set forth.

2. In a sewage filtration system having a series of stationary sprinkling nozzles, distributer conduits thereto and a main supply conduit, a dosing apparatus comprising a reservoir having a storage compartment and conduit, an overflow compartment, and a dosing compartment and conduit, said dosing conduit being in communication with said storage conduit through two separate valves and with a distributer conduit through a third valve, and said overflow compartment being in communication with a distributer conduit, and float operated mechanism for automatically operating said valves to produce an intermittent varying-head flow to the sprinklers substantially as set forth.

3. In a dosing apparatus for sewage-filter sprinklers the combination with a reservoir having a storage compartment and conduit and a dosing compartment and conduit, and separate connections between said conduits each provided with a controlling valve, an automatic operating mechanism for said valves comprising a float chamber and float therein, a rocker shaft operatively connected to both of said valves and provided with a fixed crank-arm, and a float-connected arm and a weighted lever both loosely mounted on said shaft; said weighted lever being swung in opposite directions over the dead center by the corresponding movements of the float-connected arm and thereafter engaging said crank-arm to reversely operate the connected valves substantially as set forth.

4. In a dosing apparatus for sewage-filter sprinklers the combination with a reservoir having a storage compartment and conduit and a dosing compartment and conduit, and separate connections between said conduits each provided with a controlling valve, an automatic operating mechanism for said valves comprising a float chamber and float therein, a rocker shaft operatively connected to both of said valves and provided with a fixed crank-arm, a float-connected arm and a weighted lever both loosely mounted on said shaft, and stop devices for limiting the turning movements of the shaft; said weighted lever being swung in opposite directions over the dead center by the corresponding movements of the float-connected arm and thereafter engaging said crank-arm to reversely operate the connected valves substantially as set forth.

5. In a dosing apparatus for sewage-filter sprinklers the combination with a reservoir having a storage compartment and conduit and a dosing compartment and conduit, and separate connections between said conduits each provided with a controlling valve, an automatic operating mechanism for said valves comprising a float chamber and float therein, a rocker shaft operatively connected to both of said valves and provided with a crank-arm and a counter-balance arm both loosely mounted on said shaft; said weighted lever being swung in opposite directions over the dead center by the corresponding movements of the float-connected arm and thereafter engaging said crank-arm to reversely operate the connected valves substantially as set forth.

6. In a dosing apparatus for sewage-filter sprinklers the combination with a reservoir having a storage compartment and conduit and dosing compartment and conduit, and separate connections between said conduits each provided with a controlling valve, an automatic operating mechanism for said valves comprising a float chamber and float therein, a rocker shaft operatively connected to both of said valves and provided with a crank arm, a counter-balance arm, and a supplemental weighted-arm all fixed thereto, and a float-connected arm and a weighted lever both loosely mounted on said shaft; said weighted lever being swung in opposite directions over the dead center by the corresponding movements of the float-connected arm and thereafter engaging said crank-arm to reversely operate the connected valves substantially as set forth.

7. In a dosing apparatus for sewage-filter sprinklers, the combination with separate conduit valves of mechanism for automatically operating said valves simultaneously comprising a float chamber and float therein, a rocker shaft operatively connected to both of said valves and provided with a fixed crank arm, and a float-connected arm and weighted lever both loosely mounted on said shaft; said weighted lever being swung in opposite directions over the dead center by the corresponding movements of the float-connected arm and thereafter engaging said crank-arm to reversely operate the connected valves substantially as set forth.

8. In a sewage filtration system having a series of stationary sprinkling nozzles, distributer conduits thereto and a main supply conduit, a dosing apparatus comprising a reservoir having a storage compartment and conduit, and a dosing compartment and conduit, said dosing conduit being in communication with said storage conduit through two separate valves and with a distributer conduit through a third valve, a float-operated mechanism arranged to jointly operate two of said valves, and mechanism for automatically operating the third valve in determined relation thereto substantially as set forth.

9. In a sewage filtration system having a series of stationary sprinkling nozzles, distributer conduits thereto and a main supply conduit, a dosing apparatus comprising a reservoir having a storage compartment and conduit, and a dosing compartment and conduit, said dosing conduit being in communication with said storage conduit through two separate valves and with a distributer conduit through a third valve, a float-operated mechanism arranged to jointly operate said third valve and one of the two first-mentioned valves, and mechanism for automatically operating the other valve in determined relation thereto substantially as set forth.

10. In a sewage filtration system having a series of stationary sprinkling nozzles, distributer conduits thereto and a main supply conduit, a dosing apparatus comprising a reservoir having a storage compartment and conduit, and a dosing compartment and conduit, said dosing conduit being in communication with said storage conduit through two separate valves and with a distributer conduit through a third valve, a float-operated mechanism arranged to jointly operate two of said valves and a separate float-operated mechanism for automatically operating the third valve substantially as set forth.

In testimony whereof, I affix my signature, in the presence of two witnesses.

WILLIAM C. MATTHIAS.

Witnesses:
D. M. STEWART,
W. G. STEWART.